United States Patent [19]

Klabunde et al.

[11] Patent Number: 4,740,570

[45] Date of Patent: Apr. 26, 1988

[54] METAL HALIDE VAPORIZATION INTO DILUENTS

[75] Inventors: Ulrich Klabunde, West Chester, Pa.; Rolf Mulhaupt, Wilmington, Del.

[73] Assignee: E. I. Du Pont de Nemours and Company, Wilmington, Del.

[21] Appl. No.: 930,248

[22] Filed: Nov. 13, 1986

Related U.S. Application Data

[62] Division of Ser. No. 692,585, Jan. 18, 1985, Pat. No. 4,650,778.

[51] Int. Cl.$^4$ ............................ C08F 4/62; C08F 4/64; C08F 4/68

[52] U.S. Cl. ..................... 526/125; 526/114; 526/128; 526/132; 526/135; 526/141; 526/142; 526/157; 526/158; 526/159; 526/169

[58] Field of Search ................. 502/8, 9, 104, 107, 502/111, 224, 226, 227, 231, 523; 423/491, 492, 495, 498, 499; 526/114, 125, 141, 142, 157, 159, 169, 128, 132, 135, 158

[56] References Cited

U.S. PATENT DOCUMENTS

| | | | |
|---|---|---|---|
| 3,001,951 | 9/1961 | Tornqvist et al. | 502/104 |
| 3,054,754 | 9/1962 | Lasky | 502/104 X |
| 3,288,723 | 11/1966 | Heymer et al. | 423/495 X |
| 3,407,031 | 10/1968 | Fuerer et al. | 423/492 X |
| 3,549,331 | 12/1970 | Gould et al. | 423/495 X |
| 3,623,846 | 12/1969 | Haag et al. | 23/294 |
| 3,878,293 | 4/1975 | Piccolo et al. | 423/495 |
| 3,891,746 | 6/1975 | Laffitte | 423/492 |
| 3,950,269 | 4/1976 | Setterquist | 252/430 |
| 4,021,599 | 5/1977 | Kochhar et al. | 526/124 |
| 4,066,424 | 1/1978 | Kilgren et al. | 423/492 X |
| 4,121,030 | 10/1978 | Candlin et al. | 526/119 |
| 4,149,990 | 4/1979 | Giannini et al. | 252/429 B |
| 4,194,992 | 3/1980 | Corbellini et al. | 252/442 |
| 4,215,014 | 7/1980 | Langer | 526/125 X |
| 4,217,245 | 8/1980 | Corbellini et al. | 252/429 B |
| 4,246,134 | 1/1981 | Uvarov et al. | 526/159 X |
| 4,262,102 | 4/1981 | Hoff et al. | 526/106 |
| 4,277,589 | 7/1981 | Giannini et al. | 526/122 |
| 4,331,561 | 5/1982 | Luciani et al. | 252/429 B |
| 4,421,674 | 12/1983 | Invernizzi et al. | 526/125 X |

FOREIGN PATENT DOCUMENTS 2045779A 11/1980 United Kingdom.
2046740A 11/1980 United Kingdom.

OTHER PUBLICATIONS

Wilchinsky et al., J. Catalysis 28, 351–367 (1973).
Klabunde, Academic Press, New York, 1980, chapters 3 and 4.

*Primary Examiner*—Patrick P. Garvin

[57] ABSTRACT

Metal halide particles useful, among other things, as olefin polymerization catalyst precursors and catalyst supports, are prepared by vaporizing the metal halide and then condensing it in the presence of a diluent.

11 Claims, 4 Drawing Sheets

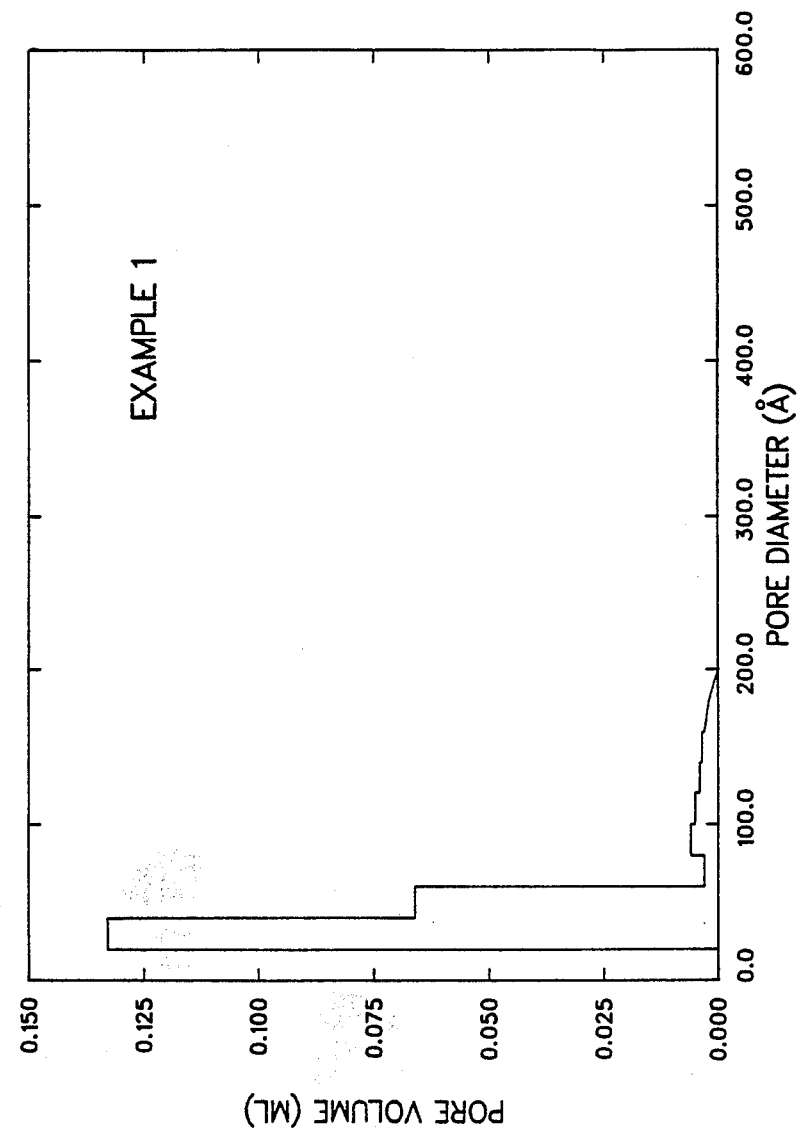

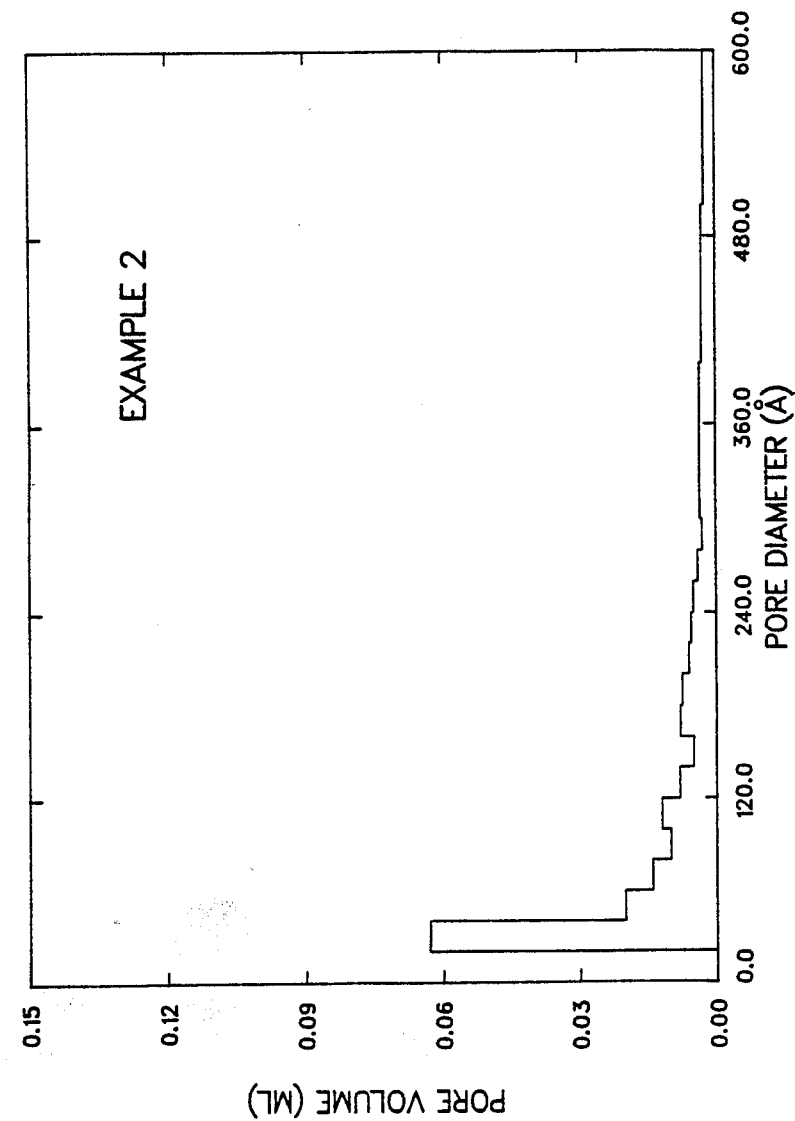

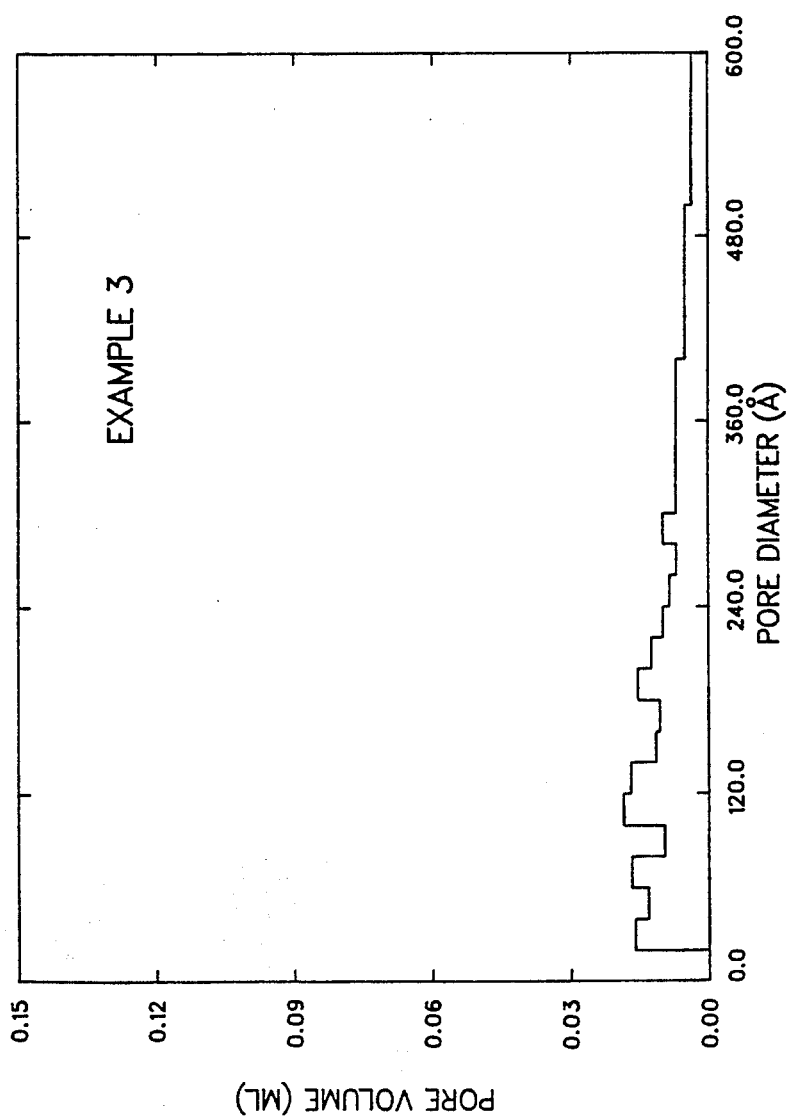

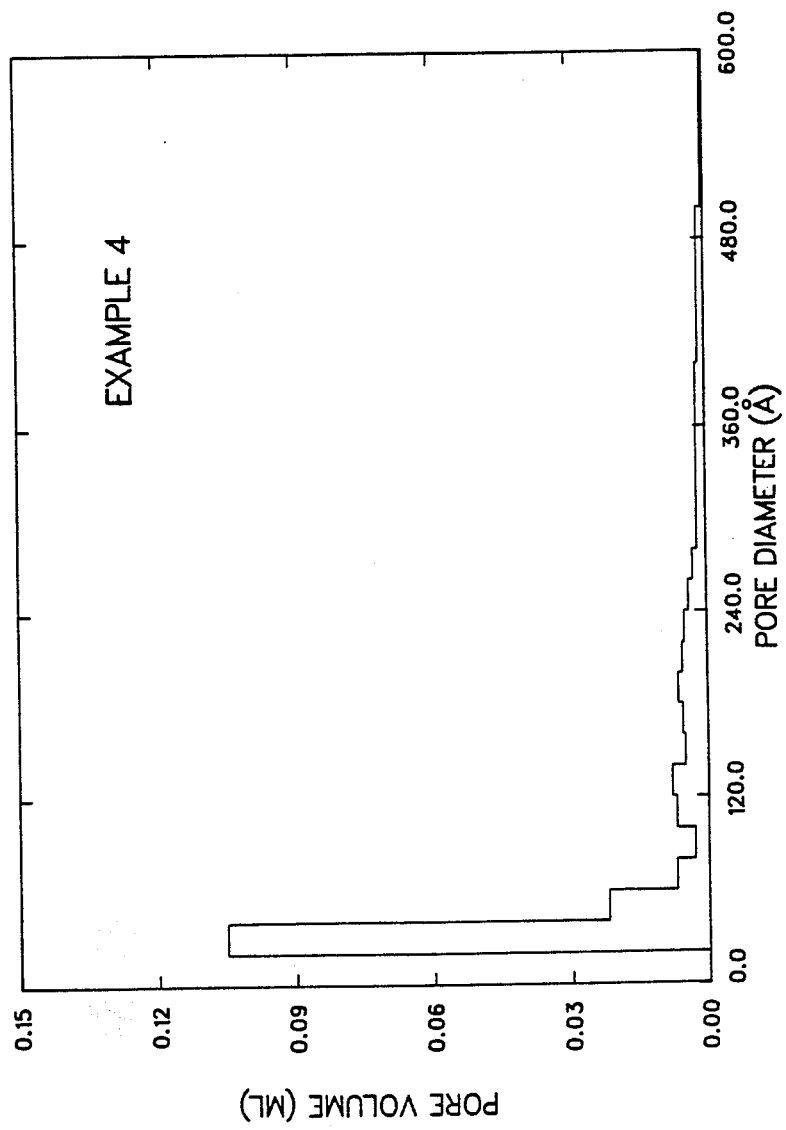

METAL HALIDE VAPORIZATION INTO DILUENTS

This is a division of application Ser. No. 692,585, filed Jan. 18, 1985 and now U.S. Pat. No. 4,650,778.

BACKGROUND OF THE INVENTION

Metal halides, supported or unsupported, are made by a vapor phase synthesis technique. The resultant halides can be reacted with metal alkyl compounds to make active olefin polymerization catalysts.

Olefin polymerization catalysts usually comprise transition metal halides such as titanium, zirconium or vanadium halides that have been activated by reaction with an alkyl derivative of a metal from Groups I, II or III of the Periodic Table.

Early (coordination) catalyst systems suffered from the serious drawback that catalyst residues often had to be removed from the polymers. The reason for their removal was that the metal halide residues of the system colored the polymers and tended to corrode fabrication machinery during the manufacturing process. In addition, when used with α-olefins other than ethylene, the early coordination catalysts gave large amounts of stereo-irregular polymer.

One method for overcoming problems with color, corrosion and lack of stereoregularity is to employ more active and stereospecific coordination catalysts that can be left in the polymer at relatively low concentrations. In this regard, it is known that the activity of titanium-containing catalysts can be increased by supporting them on magnesium halides prepared by prolonged grinding of the support or of the catalyst on the support to increase surface area and modify crystal structure before the supported catalysts are reacted with the metal alkyl. Supported catalyst or support particles made by grinding tend to agglomerate and to have broad particle size distributions whereas it is preferred that such catalysts have a narrow particle size distribution to produce low levels of fine polymer particles.

The art has attempted to solve the problems inherent in using catalysts made from mill-ground intermediates in a number of ways. For example, electron-donors, in particular esters of aromatic carboxylic acids or tertiary diamines, are added during grinding of the catalyst component to suppress agglomeration and during polymerization to increase stereospecificity of polymers from α-olefins other than ethylene.

Another proposed method for increasing catalyst activity with the expectation of lowering the amount of catalyst needed is, for example, by reacting magnesium alkyls such as Grignard reagents or magnesium alkyl-aluminum alkyl systems with transition metal compounds in the absence or presence of other chloride sources and electron donors, or by impregnating magnesium halides or other magnesium salts with transition metal halides.

A variety of metals, in particular Mg, have been used to reduce transition metal compounds according to the stoichiometric equation $2TiCl_4 + Mg \rightarrow MgCl_2 + 2TiCl_3$. As disclosed in U.S. Pat. No. 4,194,992, U.K. Pat. Nos. 2,045,779 and 2,046,740, catalysts have been prepared by reducing halides and alkoxides of transition metals in an inert diluent with metal atoms.

Other publications concerned with one or more aspects of high-activity, leave-in, coordination catalyst systems include: U.S. Pat. Nos. 3,891,746; 3,950,269; 4,021,599; 4,121,030; 4,149,990; 4,217,245; 4,262,102; 4,277,589; and 4,331,561; German Pat. No. 2,060,769; and the text by K. J. Klabunde. "Chemistry of Free Atoms and Particles", Academic Press, New York, 1980, chapters 3 and 4.

No publications have been found, however, that disclose vaporization and subsequent condensation of metal halide(s) plus complementary diluent(s). These particles may be used, for example, in the production of high-activity, leave-in coordination catalysts for olefin polymerization. The process of this invention produces particles that have high surface areas, that resist subsequent agglomeration, and that have controllable pore volume distributions. The particles are useful, for example, in polymerizing α-olefins in high yield, the polyolefins being characterized by high stereospecificities and bulk densities.

SUMMARY OF THE INVENTION

This invention concerns a method for making metal halide particles useful, among other things, as olefin polymerization catalysts directly, or as supports for such catalysts. The method comprises: (i) vaporizing one or more metal halides selected from main group metal halides and/or transition metal halides and (ii) condensing the resultant vapor in the presence of a diluent selected from one or more members of the group consisting of inert diluents and/or diluents that react with said metal halides. The method can be fine-tuned to yield specified particle properties such as pore volumes and pore diameters by controlling system parameters such as diluent flow rate and the like as discussed in more detail hereafter.

The term "diluent" is a description of a material added to the vaporized metal halide and does not connote any function. The terms "reactive" and "inert" when applied to these diluents are not absolute. An inert diluent is one which on isolation of the metal halide particles is no longer present and a reactive (coreactant) diluent is one which becomes part of the isolated particles. Reactive diluents are species such as Lewis bases, e.g., esters, or toluene, which modify the nature of the metal halide components. Inert diluents, such as heptane and cyclohexane, act as spacers, as do the reactive diluents, to separate the metal halide particles.

The diluent can be covaporized with the metal halide and/or it can be distilled or sprayed into the condensation zone. Vaporization of the diluent is not required; it is necessary only that the metal halide vaporized in step (i) be condensed in the presence of the diluent in step (ii). Thus, the method of this invention requires the vaporization of at least one metal halide and its subsequent condensation in the presence of at least one compound distinct from itself which is designated as a "diluent" even though it may also be a metal halide.

Criteria for selecting a useful diluent are that the latter not dissolve any metal halide employed in the process and that it have a low vapor pressure such that gas phase reactions are minimized. The inert diluent also must be easily removed subsequently from the vaporized metal halide by physical techniques such as filtration or decantation. Representative inert diluents are aliphatic and cyclic hydrocarbons including heptane, n-octane, isooctane, cyclohexane and decalin.

Representative of the coreactant, i.e., reactive, class of diluents are those compounds that chemically modify the vaporized metal halides under the reaction conditions that are employed while meeting the other criteria stated for inert diluents. However, some small fraction of the reactive diluent may remain in the solid active catalyst after separation of the unreacted diluent. Such coreactant diluents include: metal halides; alkoxides or oxyhalides; aromatic hydrocarbons; electron donors such as organic alcohols, alkyl and aromatic esters and ethers, boroxines, siloxanes and the like. Mixtures of inert and reactive diluents can be employed.

Preferred main group halides are $MgCl_2$ and $AlCl_3$. Preferred transition metal halides are $TiCl_3$ and $VCl_3$. The preferred inert diluent is n-heptane and the preferred reactive diluents are $TiCl_4$, $VOCl_3$, $VCl_4$, $Ti(O-Bu)_4$, ethylbenzoate, toluene, tetramethylethylene diamine and phenols.

Vaporization can be conducted at pressures of about 50 kPa to 0.001 Pa and temperatures of about 100° C. to 1200° C. Condensation temperatures are usually maintained at between about 0° C. and −200° C. which is below or above the freezing temperature of the diluent. Preferred pressures in the vaporization zone are selected to minimize gas phase reactions and are usually about 1 to 0.001 Pa. Preferred temperatures in the condensation zone are dictated by the volatility of the diluent and are selected to maintain the recited vapor pressures. Usually, the temperatures will be about −78° C. or −196° C. for simplicity of operation with standard organic diluents and about 0° C. or higher for liquid hydrocarbon polymers as diluents.

This invention also concerns a method for activating (for olefin polymerization catalysis) the transition metal halide particles made by (i) vaporization and (ii) condensation. The activation method comprises reacting said particles with a metal alkyl compound.

This invention also concerns an improvement in the method for polymerizing an olefin in the presence of an unsupported catalyst which is the reaction product of a transition metal (M) halide and an optionally different metal (M') alkyl, wherein the improvement comprises reacting the metal alkyl with a transition metal halide that has been prepared by the vaporization (i)/condensation (ii) method described above.

This invention also concerns an improvement in the method for polymerizing an olefin in the presence of a supported catalyst which is the reaction product of a supported transition metal (M) halide and a metal (M') alkyl, wherein the improvement comprises reacting the metal alkyl with transition metal halide(s) supported on main group metal halide(s) where one or more of the halides have been prepared by the vaporization (i)/condensation (ii) method described above. The method for preparing the supported catalyst can proceed by first activating the main group metal halide(s) and then reacting it with the transition metal halide(s)/metal(s) alkyl; or, the supported catalyst can be prepared by activating the main group metal halide(s) and transition metal halide(s) simultaneously and reacting the coactivated metal halides with a metal alkyl.

BRIEF DESCRIPTION OF THE DRAWINGS

FIGS. 1 to 4 are plots of pore volume vs. pore diameter for particles made according to Examples 1 to 4, respectively. The Figures demonstrate the control of particle pore volume and pore diameter that can be exercised by one skilled in the art practicing the teachings of this invention.

DETAILS OF THE INVENTION

The activated metal halides, because of their preparation method, have tunable physical characteristics as discussed in more detail herein. The activated metal halides can be used, among other things, as fillers for polymers, as supports for other particles, or as catalysts for olefin polymerization. For the latter use the particles must include a transition metal halide, preferably from Groups 4b to 6b of the Periodic Table, in combination with metal [preferably Al or Zn] alkyls.

The metal halide starting reactants are activated by vaporization/condensation steps described heretofore. The activated metal halides, if they include one or more transition metal halides, can then be reacted with metal alkyls to become active olefin polymerization catalysts. Metal halides that do not include one or more transition metal halides may be useful as olefin polymerization catalyst supports. For the latter utility, they are reacted with a transition metal halide(s) followed by activation with metal alkyl(s).

Preferred methods for making these active catalysts are as follows: (I) magnesium chloride is vaporized and co-condensed with inert hydrocarbons such as n-heptane. The high-surface-area magnesium chloride obtained is then treated with transition metal compounds such as $TiCl_4$ to give the solid catalyst component after washing and drying. To polymerize olefins the solid catalyst component is activated with aluminum alkyls. (II) Instead of vaporizing magnesium chloride followed by post-treatment with transition metal compounds, the magnesium chloride can be vaporized in the presence of a diluent containing this transition metal compound, e.g., $TiCl_4$/heptane, or neat $TiCl_4$ as reactive diluent. (III) Alternatively, a transition metal halide, e.g., $TiCl_3$, or $VCl_3$, is vaporized into diluents such as $TiCl_4$, toluene, hexane, and activated with aluminum alkyls. (IV) To render catalysts stereospecific, electron donors need to be present during activation with the aluminum alkyl and/or during the vapor synthesis of the solid catalyst component, e.g., magnesium chloride is vaporized into heptane containing ethyl toluate, followed by treatment with $TiCl_4$ and activation with $AlEt_3$ or mixtures of aluminum alkyls with additional ethyl toluate. Such catalysts can produce polypropylene containing more than 90% isotactic chains in high yields. (V) Metal oxide supported catalysts are produced by deposition of ligand-free transition metal halides, e.g., $TiCl_3$ or $VCl_3$, on metal oxides such as $SiO_2$ or $Al_2O_3$. Type V catalysts are also activated with main-group-metal alkyls to polymerize olefins.

After activation by the vaporization/condensation method of this invention, the metal halides which include one or more transition metal halides are reacted with metal alkyls to complete their preparation as olefin polymerization catalysts. Activated metal halides which do not include one or more transition metal halides can be used as catalyst supports after they are reacted with a transition metal halide and a metal alkyl compound.

The activation step of this invention can be run separately. Alternatively, when the metal halide does not include one or more transition metal halides, metal halide activation can be carried out in the presence of a transition metal halide. Physical separation of vaporized metal halide molecules is an important role of the diluent(s), but may not be their only role. The reactive diluent(s) also react with or otherwise modify catalyst particles formed during vaporization/condensation.

The vaporization/condensation method for activating metal halides has several advantages over prior art activation techniques. For instance, the method of this invention gives reproducible, less time-consuming, and controlled production of metal halide particles. This method is characterized, among other things, by the interrelationship between flow rate of diluent and pore volume distribution. The pore volume distribution of particles can be controlled and varied as desired by change of the system parameters of reactor size and geometry, temperature, pressure, and rates of metal halide vaporization and diluent addition as will be appreciated from FIGS. 1 to 4. The greater the flow rate of diluent, the narrower the pore volume distribution.

The method of this invention also allows control of the surface area of the particles. Relatively higher diluent flow rates produce particles of correspondingly greater surface area. This feature is in contrast to prior art sublimation methods that produce large particles having relatively small (compared to particles produced by the method of this invention) surface area.

Contemplated metal halides for vaporization in step (i) of this process have appropriate boiling points, vapor pressures and stabilities to allow vaporization by resistive heating or by electron-beam, laser, or arc techniques, with the formation of (preferably) mono- or oligomeric metal halide molecules in the vapor phase. Sublimation gives poor results due to the formation of clusters and agglomerates. Suitable metal halides include: $MgCl_2$, $MgF_2$, $NaCl$, $NaF$, $KF$, $CsF$, $TiCl_3$, $VCl_3$, $ZrCl_4$, $MoCl_4$, $WCl_6$, $CrCl_3$, $ReCl_3$, $TiF_4$, $VF_3$, $TiF_3$, $CrBr_3$, $CrBr_2$, $MnCl_2$, $MnF_2$, $ZrBr_4$, $NbCl_5$, $MoF_6$, $HfCl_4$, $WCl_5$, $ReCl_4$, $ReCl_5$, $FeCl_2$, $FeCl_3$, $CoBr_2$, $NiBr_2$, $NiCl_2$, $RuCl_3$, $RuF_3$, $RhF_3$, $CuBr$, $CuCl$, $AgCl$, $ZnCl_2$, $ZnBr_2$, $ZnI_2$, $CdBr_2$, $CdCl_2$, $CdF_2$, $HgBr_2$, $HgCl_2$, $AlCl_3$, $AlBr_3$, $GaCl_3$, $SnCl_2$, $SnBr_2$, $PbCl_2$, $LaF_3$, $CaCl_2$, $CeCl_3$ and $LuCl_3$.

Co-vaporization of different metal halides such as $NaCl/MgCl_2$, allows reduction of the energy required for vaporization (if resistive heating is used) in part due to the formation of associated vapor phase species. By vaporizing selected metal halide species as supports for the transition metal halide catalyst species, e.g., $MgCl_2$ and $TiCl_3 \cdot 0.33\ AlCl_3$, it is possible to prepare supported transition metal halides which have substantially higher activities in olefin polymerization, especially when $MgCl_2$ is the support component.

Transition metal halides such as $TiCl_3$, $TiCl_3 \cdot 0.33\ AlCl_3$, $VCl_3$, and the like, can be vaporized and co-condensed with various diluents. In the case of $TiCl_3$ produced by hydrogen reduction of $TiCl_4$, the resulting high surface area $TiCl_3$ has narrow pore volume distribution and gives good activity in ethylene and propylene polymerization. The presence of vanadium is most favorable for improved activity in ethylene polymerization. In the case of $TiCl_3 \cdot 0.33\ AlCl_3$ (aluminum reduced $TiCl_4$), catalyst activity may decrease due to partial fractionation during vaporization. Vapor synthesis also allows deposition of ligand-free transition metal halides on supports (as with the $SiO_2/TiCl_3$ system).

When the temperature in the condensation zone is below the freezing temperature of the diluent, metal halide molecules are isolated in the diluent matrix on the cold surface of the condensation zone and they condense after warm up. When the condensation is carried out above the freezing temperature of the diluent, the metal halide vapor is condensed on the cold surface of the liquid diluent which is agitated to renew the surface continuously.

Vaporization is conducted under a reduced pressure to minimize gas phase reactions. The relatively low boiling points of halides such as $MgCl_2$ and $TiCl_3$ allow vaporization to be carried out at temperatures of about 400° to 700° C. Temperature need not be measured. Rather, when resistive heating is used, the voltage of the power supply for the resistance heater is increased slowly until vaporization is observed to be complete. The speed of the vaporization can be increased substantially if the flow of the diluent is increased accordingly and the necessary vacuum can be maintained.

Vaporization can be carried out in a stationary apparatus as described by K. J. Klabunde, "The Chemistry of Free Atoms and Particles", Academic Press, New York, 1980. The experiments can be conducted in a batch process, i.e., after vaporization and condensation is completed, the resultant suspension is filtered and is washed and dried. it is also feasible, however, to run the vapor synthesis as a continuous process on a larger scale.

Main group metal halides can be used to prepare high surface area olefin polymerization catalyst supports. For example, $MgCl_2$ can be vaporized and condensed together with various transition metal components, e.g., $TiCl_4$, $VCl_4$, $VOCl_3$, and/or $Ti(OBu)_4$, or can be reacted with these components as a post-treatment after condensation. The titanium content of the $MgCl_2/TiCl_4$ particles does not depend greatly upon the concentration of $TiCl_4$ in the diluent mixtures. When using neat $TiCl_4$ or n-heptane/$TiCl_4$ (0.1 mol $TiCl_4$/L), the content of titanium incorporated in the $MgCl_2$ particles varies between 4% and 6%. However, when an electron donor is present during the vapor synthesis, the titanium content is lower (0.1% to 3%) and the catalyst performance improves. Vaporizing $MgCl_2$ into toluene/$TiCl_4$ gives a catalyst of higher activity when the catalyst is washed with toluene instead of with heptane.

Lewis bases can be employed to enhance stereospecificity in the polymerization of α-olefins, especially propylene. Lewis bases such as ethyl benzoate, N,N,N'N'-tetramethylethylene diamine (TMEDA), diisoamylether, 2,6-di-t-butyl-4-methyl phenol can be added together with n-heptane (Lewis base/Mg molar ratio=0.001 to 1) during vaporization of $MgCl_2$ and this can be post-treated with hot, neat $TiCl_4$. Alternatively, high surface area $MgCl_2$, prepared by condensing $MgCl_2$ vapors together with n-heptane, can be post-reacted with Lewis base/heptane mixtures (Lewis base/Mg molar ratio=0.001 to 1) and then stirred for 1 to 4 hours with neat $TiCl_4$.

Good steric control is obtained when esters of aromatic carboxylic acids or phenols are present in the diluent during the condensation of $MgCl_2$ and this is followed by treatment with neat $TiCl_4$ at elevated temperatures. However, in order to obtain high stereospecificity, another or the same Lewis base can be added together with the activator aluminum alkyl during polymerization. The Lewis base/aluminum alkyl molar ratio can be between 0.2 and 0.5. With a catalyst prepared in the presence of ethyl toluate and activated with $AlEt_3$ modified by ethyl toluate, 96% isotactic polypropylene can be obtained in yields high enough to obviate catalyst residue removal.

At diluent flow rates that are relatively low (metal halide concentration, 1 mol/L), the pore volume distribution is broad, resembling that of catalysts prepared by the grinding process. Increase in the diluent flow rate results in a more dilute matrix, $MgCl_2$ having a narrower pore volume distribution and polymer having a narrower molecular weight distribution in ethylene polymerization. In most cases, the particle size distribution of the resulting polyethylene particles is narrow (over 80% between 40 and 270 mesh) and formation of clods and ultra-fine powder are not observed, thus allowing handling of a high concentration of solids in the slurry (preferably 10% to 15%, but even up to 50%).

Typically, the method of this invention produces catalyst suspension (after melting of the matrix) concentrations of 0.1 to 10 mol/L. This concentration of the vaporized metal halide in the matrix, the rate of flow of the diluent and the rate of vaporization, determine the particle properties of the product. The higher the dilution of the matrix, the narrower the pore volume distribution and the higher the surface area. At concentrations lower than about 1 mol of metal halide/L of diluent, the pore volume distributions are found to be very narrow. Surface areas are increased up to about 600 $m^2/g$ by addition of reactive diluents to the inert diluent. Other variables such as matrix temperature or rate of melting of the matrix can also affect particle properties.

Most of the $MgCl_2$-supported, metal halide-based olefin polymerization catalysts prepared by this method possess such an activity that there is no necessity to remove catalyst residues. It is possible to homo-and copolymerize ethylene as well as higher 1-olefins ($C_3$ to $C_{20}$), e.g., propylene, butene-1, 4-methyl-1-pentene, hexene-1, octene-1, eicosene-1, and substituted styrenes.

The solid catalyst component obtained by the vapor process has to be activated by metal alkyls, preferably aluminum and zinc alkyls such as $Al(C_2H_5)_3$, $Al(C_2H_5)_2Cl$, $Al(C_4H_9)_3$, $(C_2H_5)_2Al-O-Al(C_2H_5)_2$, $Zn(C_2H_5)_2$, and the like, which are added either in the absence or in the presence of the monomer. For practical reasons, in $MgCl_2$ supported $TiCl_4$ catalysts, the activator alkyl is used in large excess, that is activator/titanium ratios are 5 to 1000. The polymerization of gaseous monomers is carried out in slurry or solution at temperatures between 5° C. and 230° C. at pressures of $0.1 \times 10^6$ Pa up to $50 \times 10^6$ Pa, the hold-up time being several minutes in the continuous solution process at temperatures of about 200° C. and several minutes to hours in the slurry process at temperatures of about 60° to 90° C.

The average molecular weight, $\overline{M}_w$, as measured by GPC, of the polyolefins produced even at low pressures is very high ($>10^6$) and can be reduced either by increased reactor temperature or by addition of hydrogen or excess metal alkyls, especially zinc alkyls.

The following Examples illustrate the invention. The Table summarizes pertinent details from the Examples including the nature of the metal halide, diluent, percent of titanium in the product, and surface area in square meters per gram.

TABLE

| Example | Metal Halide | Metal Halide Surface Area | Diluent | % Ti[c] |
|---|---|---|---|---|
| 1 | $MgCl_2$ | 170 | $TiCl_4$ | 4 |
| 2 | $MgCl_2$ | 83 | heptane/$TiCl_4$ | 5 |
| 3 | $MgCl_2$ | 73 | heptane/$TiCl_4$ | 4 |
| 4 | $MgCl_2$ | 145 | heptane/$TiCl_4$ | 6 |
| 5 | $MgCl_2$ | 57 | toluene/$TiCl_4$ | 5 |
| 6 | $MgCl_2$ | 37 | toluene/$TiCl_4$ | 2 |
| 7 | $MgCl_2$ | 319 | hexamethyldisiloxane/$TiCl_4$ | 1 |
| 8 | $MgCl_2$ | 21 | p-diisoprop.benzene/$TiCl_4$ | 4 |
| 9 | $MgCl_2$/NaCl | 72 | heptane/$TiCl_4$ | 3 |
| 10 | $MgCl_2$/$AlCl_3$ | 245 | heptane/$TiCl_4$ | 5 |
| 11 | $MgCl_2$ | 606 | heptane/trimethoxyboroxine | 3[a] |
| 12 | $MgCl_2$ | — | heptane | 2[a] |
| 13 | $MgCl_2$ | 120 | heptane/ethyl p-toluate | 1[a] |
| 14 | $MgCl_2$/$TiCl_3$ | 229 | heptane | 4 |
| 15 | $TiCl_3$ | 64 | toluene | 16 |
| 16 | $TiCl_3$ | 158 | $TiCl_4$ | 18 |
| 17 | $TiCl_3$ | 30 | heptane/$VCl_4$ | 1,20V |
| 18 | $VCl_3$ | 57 | $TiCl_4$ | 5,21V |
| 19 | $TiCl_3$ | — | p-diisopropylbenzene[b] | 5 |

[a] The source of Ti was $TiCl_4$ that was subsequently reacted with particles of the vaporized/condensed $MgCl_2$.
[b] $SiO_2$ added as a support for the $TiCl_3$ particles formed.
[c] To nearest whole percent.

EXAMPLE 1

By the method described in Example 4, 12 g of $MgCl_2$ were vaporized and co-condensed with 200 ml of $TiCl_4$, 50 ml of which had been added before vaporization was started. The yield was 7.3 g of a yellow solid which contained 4.21% of Ti. This solid (85.9 mg) activated with 1 ml of $AlEt_3$ in 150 ml of n-heptane, at 67° to 68° C. and $0.2 \times 10^6$ Pa of propylene pressure during two hours, produced 46.0 g of polypropylene, $[\eta] = 1.93$ dl/g [40.6% insoluble in boiling n-heptane]. This catalyst (38.0 mg) activated by 2 ml of $AlEt_3$ in 150 ml of n-heptane. yielded 36.1 g of polyethylene, $[\eta] = 7.8$ dl/g, at 67° to 73° C. and $0.1 \times 10^6$ Pa during one hour.

EXAMPLE 2

By the method of Example 3, 8.0 g of $MgCl_2$ were vaporized and co-condensed with 150 ml of n-heptane (100 ml of which had been distilled into the reaction zone before vaporization of $MgCl_2$ was started) and 9 ml of $TiCl_4$ during two hours at the temperature of liquid nitrogen. A yellow solid (6.4 g) was isolated containing 4.98% of Ti. This catalyst (125 mg) activated by 1 ml $AlEt_3$, in 150 ml of heptane was maintained at $0.2 \times 10^6$ Pa of propylene pressure and at 68° to 73° C. for two hours. This yielded 44.1 g of polypropylene, $[\eta] = 1.27$ dl/g. [36.0% polypropylene insoluble in boiling n-heptane]. Polyethylene (54.0 g) $[\eta] = 6.6$ dl/g, was produced by 43.9 mg of this catalyst at $0.1 \times 10^6$ Pa of ethylene pressure and 83° to 88° C.

EXAMPLE 3

The metal halides were vaporized from a Sylvania ® Emissive Products crucible which was located in the center of a 10 L glass vacuum static vessel and resistance heated by water-cooled copper electrodes. The glass flask was connected via an O ring seal to a brass head fitted with a central spray-out tube for the diluent, and with a port which led to the pumping system.

The 10 L glass flask was rinsed with 10 ml of trimethylchlorosilane then evacuated at 1 Pa overnight.

Under argon, 5 g of anhydrous MgCl$_2$ was charged into the crucible and degassed (1 Pa) by melting the MgCl$_2$ until vaporization started to occur. Then the flask was cooled with liquid nitrogen, 130 ml of n-heptane and 2 ml of TiCl$_4$ were simultaneously distilled into the flask over two hours as the voltage of the resistance heater power supply was gradually increased to exceed the value required for vaporization of MgCl$_2$. After two hours, when all of the MgCl$_2$ was vaporized, the resistance heater was turned off, an additional 70 ml of heptane and 4 ml of TiCl$_4$ was added, the flask was warmed to room temperature, vented with argon, and then transferred to a nitrogen dry box, which was continuously purified of moisture and oxygen. Filtration and washing three times with 100 ml of n-heptane yielded 3.2 g of a pale yellow fine powder which contained 4.24% of Ti.

EXAMPLE 4

MgCl$_2$ (13 g) was pressed at 200×10$^6$ Pa to form a pellet which was placed in the crucible. Following the procedures described in Example 3, 200 ml of heptane was distilled into the reaction zone before vaporization, and 300 ml of n-heptane and 15 ml of TiCl$_4$ were co-condensed with the MgCl$_2$ vapors to form 6.5 g of a yellow solid which contained 5.78% of Ti.

This solid (9.1 mg) activated by 1 ml of AlEt$_3$ in 150 ml of heptane at 0.2×10$^6$ Pa of propylene and 68° C. within two hours yielded 22.0 g of polypropylene, $[\eta]$=1.34 dl/g, [36.9% insoluble in boiling n-heptane]. The same catalyst (41.5 mg) activated by 1 ml of AlEt$_3$ in 150 ml of n-heptane at 67° to 72° C. and 0.1×10$^6$ Pa of ethylene pressure within one hour yielded 48.6 g of polyethylene, $[\eta]$=7.4. This Example represents a preferred embodiment of this invention.

EXAMPLE 5

By the method of Example 4, 11 g of MgCl$_2$ were vaporized and co-condensed with 15 ml of TiCl$_4$ and 250 ml of n-heptane, 100 ml of which has been added over one hour before starting the vaporization. The black solid turned brown after it was filtered, washed with n-heptane and dried, and 7.4 g containing 4.69% of Ti were isolated. This catalyst (97.6 mg) activated by 1 ml of AlEt$_3$ in 150 ml of n-heptane, and at 0.2×10$^6$ Pa of propylene pressure and 68° C. within two hours yielded 37 g of polypropylene, $[\eta]$=1.82 dl/g, [38.0 insoluble in boiling heptane]. This catalyst (40.9 mg) activated by 1 ml of AlEt$_3$ in 150 ml of n-heptane, produced 46.0 g of polyethylene, $[\eta]$=7.8 dl/g, in one hour at 0.1×10$^6$ Pa of ethylene pressure and 67° to 74° C.

EXAMPLE 6

Substantially the same procedure as in Example 5 was carried out, vaporizing 12 g of MgCl$_2$ and co-condensing it with 20 ml of TiCl$_4$ and 450 ml of n-heptane, 150 ml of which had been added before vaporization was started. After one hour, the suspension was filtered and the residue washed with toluene instead of with n-heptane, yielding a brown solid containing 1.77% of Ti. This solid (108.3 mg) activated by 1 ml of AlEt$_3$ in 150 ml of n-heptane, at 67° to 71° C. and 0.2×10$^6$ Pa of propylene pressure produced 44.6 g of polypropylene, $[\eta]$2.40 dl/g, [35.0% insoluble in boiling n-heptane]. This catalyst (41.6 mg) when activated with 1 ml of AlEt$_3$ in 150 ml of n-heptane produced 32.4 g of polyethylene, $[\eta]$=7.3 dl/g, during one hour at 66° to 72° C. and 0.1×10$^6$ Pa of ethylene pressure.

EXAMPLE 7

By the method of Example 4, 10 g of MgCl$_2$ was vaporized and co-condensed with 300 ml of hexamethyldisiloxane and 20 ml of TiCl$_4$ over 1.5 hours. A colorless solid which contained 1.23% of Ti was isolated. This solid (96.5 mg) activated by 1 ml of AlEt$_3$ in 150 ml of n-heptane, at 66° to 68° C. and 0.2×10$^6$ Pa of propylene pressure over two hours produced 10.3 g of polypropylene, $[\eta]$=0.83, [32.5% heptane insoluble]. This catalyst (38.6 mg) activated by 2 ml of AlEt$_3$ in 150 ml of n-heptane produced 28.8 g of polyethylene at 0.1×10$^6$ Pa of ethylene pressure and 64° to 71° over one hour.

EXAMPLE 8

The vaporization was carried out above the freezing temperature of the diluent. The crucible was covered with a platinum sheet in order to deflect the metal halide vapors down to the cold surface of the liquid diluent mixture which was agitated magnetically. Thus, 12.5 g of MgCl$_2$, treated as described in Example 4, was vaporized and condensed together with 200 ml of p-diisopropyl benzene onto a cold surface of 300 ml of p-diisopropylbenzene containing 20 ml of TiCl$_4$, using acetone/dry ice as coolant for the flask. Recovering the catalyst as described in Example 4 gave 5.2 g of a solid containing 3.82% of Ti. This solid (105.6 mg) activated by 2 ml of AlEt$_3$ in 150 ml of n-heptane, at 67° to 68° C. and 0.2×10$^6$ Pa of propylene pressure over 165 minutes yielded 28.3 g of polypropylene, $[\eta]$=1.14 dl/g [34.5% insoluble in heptane]. This catalyst (50.4 mg) activated by 2.0 ml of AlEt$_3$ in 150 ml of n-heptane, produced 20.7 g of polyethylene over one hour at 65° to 67° C. and 0.1×10$^6$ Pa of ethylene pressure.

EXAMPLE 9

By the method of Example 4, a pellet consisting of 8.6 g of MgCl$_2$ and 2.6 g of NaCl was vaporized and co-condensed with 500 ml of n-heptane containing 10 ml of TiCl$_4$, 300 ml of this mixture being sprayed into the condensation zone before vaporizing the metal halide mixture and 200 ml during the vaporization over 1 hour. Only half as much energy as needed in Example 4 was required for the vaporization. A light yellow solid was isolated, containing 3.19% of Ti. This solid (118.1 mg) activated by 2 ml of AlEt$_3$ in 150 ml of n-heptane, at 0.2×10$^6$ Pa of propylene pressure and 65° to 68° C. over three hours produced 3.85 g of polypropylene, $[\eta]$=0.73 dl/g, [41.3% insoluble in boiling n-heptane]. This catalyst (51.3 mg) activated by 2 ml of AlEt$_3$ in 150 ml of n-heptane, produced 7.6 g of polyethylene, $[\eta]$=5.72 dl/g at 65° to 68° C. and 0.1×10$^6$ Pa of ethylene pressure over 70 minutes.

EXAMPLE 10

By substantially the same method as described in Example 9, a metal halide mixture of 9.52 g of MgCl$_2$ and 2.70 g of AlCl$_3$ was vaporized, yielding 8.9 g of a greenish yellow solid. This solid (125.9 mg) activated by 2 ml of AlEt$_3$ in 150 ml of n-heptane, at 65° to 68° C. and 0.2×10$^6$ Pa of propylene pressure over two hours produced 51.9 g of polypropylene, $[\eta]$=1.29 dl/g, [39.3% insoluble in boiling n-heptane]. This catalyst (49.1 mg) activated with 2 ml of AlEt$_3$ in 150 ml of n-heptane, produced 24.9 g of polyethylene. $[\eta]$=7.09 dl/g over 70 minutes at 65° to 70° C. and 0.1×10$^6$ Pa.

EXAMPLE 11

By the method of Example 4, 11 g of MgCl$_2$ were vaporized and 500 ml of n-heptane containing 5.8 g of trimethoxyboroxine were sprayed into the condensation zone, 200 ml before and 300 ml during the vaporization. After one hour, the suspension was filtered and washed as described in Example 4. Then the solid was stirred for four hours in 20 ml of TiCl$_4$, filtered, washed three times with n-heptane and dried overnight at oil pump vacuum, yielding 11.6 g of a solid containing 2.71% of Ti. This solid (81.3 mg) activated with 2 ml of AlEt$_3$ in 150 ml of n-heptane, at 0.2×10$^6$ Pa of propylene pressure and 65° to 68° C. over two hours produced 11.0 g of polypropylene, [$\eta$]=1.34 dl/g, [43.6% insoluble in boiling n-heptane]. This catalyst (28.4 mg) activated by 2 ml of AlEt$_3$ in 150 ml of n-heptane, yielded 15.2 g of polyethylene, [$\eta$]=7.9 dl/g, over one hour at 0.1×10$^6$ Pa of ethylene pressure and 65° to 68° C.

EXAMPLE 12

MgCl$_2$ (1.20 g) was activated by vaporization during one hour as 150 ml of n-heptane was co-condensed onto the surface of a glass flask. Then, it was suspended in a mixture of 206 mg of ethyl-p-toluate and 20 ml of n-heptane, stirred overnight, filtered, washed three times with 50 ml of n-heptane, suspended in a mixture of 10 ml of TiCl$_4$ and 2.5 ml of n-heptane, stirred for four hours, filtered, washed three times with 50 ml of n-heptane, and dried at room temperature and oil pump vacuum overnight. The yield was 1.0 g of an intense yellow solid containing 1.81% of Ti. This solid (122.9 mg) activated with 2.0 ml of AlEt$_3$ in 150 ml of n-heptane, under 0.2×10$^6$ Pa of propylene pressure at 67° to 69° C. over 110 minutes produced 16.3 g of polypropylene, [$\eta$]=1.00 dl/g, [51.0% insoluble in boiling n-heptane]. This catalyst (51.5 mg) activated with 2.0 mL of AlEt$_3$ in 150 ml of n-heptane, yielded 14.1 g of polyethylene over one hour at 67° to 71° C. and 0.1×10$^6$ Pa of ethylene pressure.

EXAMPLE 13

Part A

By the method described in Example 4, 10 g of MgCl$_2$ was vaporized and co-condensed with a mixture of 300 ml of n-heptane and 30 g of ethyl-p-toluate, yielding 12.8 g of a white solid.

Part B

Then, 4.0 g of the solid obtained in Part A was refluxed in 50 ml of TiCl$_4$ for four hours, filtered, washed three times with 150 ml of n-heptane, dried overnight at room temperature and oil pump vacuum, yielding 3.5 g of a solid which contained 0.53% of Ti and had a surface area of 120 m$^2$/g. This solid (106.6 mg) activated with 1 ml of AlEt$_3$ in 150 ml of n-heptane, at 65° to 68° C. and 0.2×10$^6$ Pa of propylene pressure over two hours produced 12.7 g of polypropylene, [$\eta$]=1.40 dl/g, [42.3% insoluble in boiling n-heptane]. This catalyst (48.1 mg) activated by 1 ml of AlEt$_3$ in 150 ml of n-heptane, produced 4.2 g of polyethylene over 60 minutes at 65° to 67° C. and 0.1×10$^6$ Pa of ethylene pressure.

EXAMPLE 14

By the method of Example 4, a mixture of 7.6 g of MgCl$_2$ and 5.0 g of TiCl$_3$.0.33 AlCl$_3$ (Stauffer) was vaporized and condensed with 500 ml of n-heptane sprayed into the condensation zone (200 ml before starting the vaporization and 300 ml during vaporization). A pale brown solid (4.5 g) was isolated following the procedures of Example 3. This solid had a titanium content of 3.90% and a surface area of 228 m$^2$/g. Activation of 105.6 mg of this solid was accomplished with 2.0 ml AlEt$_3$ in 150 ml of n-heptane, at 65° to 70° C. Yield at 0.2×10$^6$ Pa of propylene pressure was 33.7 g of polypropylene, [$\eta$]=1.05 dl/g, [36.0% insoluble in boiling n-heptane]. This catalyst (60.9 mg) activated with 2.0 ml of AlEt$_3$ in 150 ml of n-heptane, yielded 20.2 g of polyethylene over 70 minutes at 0.1×10$^6$ Pa of ethylene pressure and 65° to 68° C.

EXAMPLE 15

By the method of Example 4, 11.6 g of TiCl$_3$ (hydrogen-reduced) was vaporized and co-condensed with 550 ml of n-heptane (200 ml of the latter was introduced before and 350 ml during vaporization over two hours), yielding 3.25 g of a dark purple solid. This solid (209.1 mg) activated with 0.5 ml of AlEt3 in 150 ml of n-heptane, at 65° to 68° C. and 0.3×10$^6$ Pa over two hours yielded 33.6 g of polypropylene, [54.6 insoluble in boiling n-heptane]. This catalyst (145.6 mg) activated by 0.5 ml of AlEt$_3$ in 150 ml of n-heptane, produced 39.8 g of polyethylene over one hour at 65° to 70° C. and 0.1×10$^6$ Pa of ethylene pressure.

EXAMPLE 16

By the method of Example 4, 9.8 g of TiCl$_3$ (hydrogen-reduced) was vaporized and co-condensed with 500 ml of TiCl$_4$ (sprayed into the condensation zone 200 ml before and 300 ml during vaporization over two hours), yielding 6.6 g of a dark brown solid. This solid (204.4 mg) activated with 0.5 ml of AlEt$_3$ in 150 ml of n-heptane, at 65° to 70° C. and 0.1×10$^6$ Pa of ethylene pressure produced 37.7 g of polyethylene.

EXAMPLE 17

By the method of Example 4, 10 g of TiCl$_3$AA (Al reduced TiCl$_3$ containing 23% of AlCl$_3$, Stauffer) was vaporized and condensed with a mixture of 500 ml of n-heptane and 40 g of VCl$_4$ sprayed into the condensation zone, yielding 9.8 g of a dark solid containing 0.93% of Ti and 20.4% of V. This solid (198.0 mg) activated with 0.5 mg of AlEt$_3$ in 150 ml of n-heptane, at 65° to 69° C. and 0.3×10$^6$ Pa over 65 minutes produced 24.9 g of polypropylene, [56.4% insoluble in boiling heptane]. This catalyst (145.3 mg) activated with 0.5 ml of AlEt$_3$ in 150 ml of n-heptane, at 0.1×10$^6$ Pa of ethylene pressure and 65° to 70° C. within 30 minutes yielded 44.6 g of polyethylene.

EXAMPLE 18

By the method of Example 4, 11.8 g of VCl$_3$ was vaporized and co-condensed with 600 ml of TiCl$_4$ (300 ml sprayed into the condensation zone during vaporization) yielding 3.0 g of a solid containing 4.84% of Ti and 21.4% of V. This solid (194.9 mg) activated with 0.5 ml of AlEt$_3$ in 150 ml of n-heptane, at 0.3×10$^6$ Pa of propylene pressure and 65° to 79° C. over 25 minutes produced 12.6 g of polypropylene, [$\eta$]=2.20 dl/g, [45.6% insoluble in boiling n-heptane]. This catalyst (140.8 mg) activated with 0.5 ml of AlEt$_3$ in 150 ml of n-heptane, at 0.1×10$^6$ Pa of ethylene pressure and 65° to 70° C. over 30 minutes produced 41.8 g of polyethylene.

EXAMPLE 19

Using the procedure of Example 8 for vaporization above the freezing temperature of the deagglomerant, 11.3 g of TiCl$_3$ (hydrogen-reduced) was vaporized onto the cold surface of 400 ml of liquid p-diisopropylbenzene which contained 10 g of SiO$_2$ (dried at 0.01 Torr and 250° for four hours). This was stirred at −50° C. using acetone and small amounts of dry ice as coolant. The TiCl$_3$ was co-condensed with an additional 400 ml of p-diisopropylbenzene which was sprayed into the reactor during vaporization, yielding a black suspension affording 24 g of a pale green solid after drying. This catalyst (255.1 mg) activated with 2 ml of AlEt$_3$ in 150 ml of n-heptane, at 65° to 70° C. and 0.3×10$^6$ Pa of propylene pressure over two hours produced 4.7 g of polypropylene containing 63.0% of polypropylene insoluble in boiling n-heptane. This catalyst (207.2 mg) activated with 0.5 ml of aluminum alkyl in 150 ml of n-heptane, at 0.1×10$^6$ Pa of ethylene pressure and 65° to 70° C. over 60 minutes produced 17.4 g of polyethylene.

The embodiments of the invention in which an exclusive property or privilege is claimed are defined as follows:

1. In the method for polymerizing an olefin in the presence of an unsupported catalyst, said catalyst being the reaction product of a transition metal halide and a metal alkyl selected from the group of aluminum alkyl and zinc alkyl, the improvement which comprises (a) preparing said transition metal halide by (i) vaporizing one or more transition metal halides and (ii) condensing the resultant vapor in the presence of at least one diluent selected from the group consisting of metal halides, metal alkoxides, metal oxyhalides, aromatic hydrocarbons, electron donors, siloxanes and boroxines, the latter seven being reactive with said transition metal halides, and (b) reacting the resultant transition metal halide with said metal alkyl.

2. The method of claim 1 wherein said transition metal halide is at least one metal halide selected from the group consisting of chlorides, bromides and fluorides of titanium and vanadium.

3. The method of claim 1 wherein said transition metal halide is TiCl$_3$.

4. The method of claim 1 wherein said transition metal halide is VCl$_3$.

5. In the method for polymerizing an olefin in the presence of a supported catalyst, said catalyst being the reaction product of a transition metal halide and a metal alkyl selected from the group of aluminum alkyl and zinc alkyl, the improvement which comprises (a) preparing said transition metal halide by (i) vaporizing one or more transition metal halides and (ii) condensing the resultant vapor in the presence of at least one diluent selected from the group consisting of metal halides, metal alkoxides, metal oxyhalides, aromatic hydrocarbons, electron donors, siloxanes and boroxines, said diluent being reactive with said transition metal halides, supporting the transition metal halide on a main group metal halide prepared by vaporizing and condensing a main group metal halide, and (b) reacting the resultant transition metal halide with said metal alkyl.

6. The method of claim 5 wherein said main group metal halide is at least one member of the group of chlorides, bromides and fluorides of sodium, potassium, magnesium and aluminum.

7. The method of claim 5 wherein said main group metal halide is MgCl$_2$.

8. The method of claim 5 wherein said main group metal halide is AlCl$_3$.

9. The method of claim 5 wherein said transition metal halide and said main group metal halide are vaporized and condensed substantially simultaneously.

10. The method of claim 5 wherein said main group metal halide is vaporized and condensed, and then reacted with the transition metal halide.

11. The method of claims 9 or 10 wherein said main group metal halide is at least one member of the group of chlorides, bromides and fluorides of sodium, potassium, magnesium and aluminum.

* * * * *